United States Patent
Rajaram

(10) Patent No.: US 8,190,830 B2
(45) Date of Patent: May 29, 2012

(54) METHOD, APPARATUS, AND SYSTEMS TO SUPPORT EXECUTION PIPELINING IN A MEMORY CONTROLLER

(75) Inventor: Gurumurthy Rajaram, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 1496 days.

(21) Appl. No.: 11/372,647

(22) Filed: Mar. 10, 2006

(65) Prior Publication Data

US 2007/0150673 A1    Jun. 28, 2007

(30) Foreign Application Priority Data

Dec. 23, 2005  (IN) .......................... 3469/DEL/2005

(51) Int. Cl.
*G06F 13/00*    (2006.01)
(52) U.S. Cl. ................ 711/154; 712/3; 700/4
(58) Field of Classification Search ........... 712/3; 700/4
See application file for complete search history.

(56) References Cited

U.S. PATENT DOCUMENTS

| | | | |
|---|---|---|---|
| 3,418,638 A * | 12/1968 | Tomasulo et al. .............. | 712/233 |
| 3,566,366 A * | 2/1971 | Quinn et al. .................. | 712/210 |
| 5,434,986 A * | 7/1995 | Kuslak et al. .................. | 712/216 |
| 5,664,194 A * | 9/1997 | Paulsen ......................... | 717/178 |
| 5,922,070 A * | 7/1999 | Swoboda et al. .............. | 712/244 |
| 6,810,466 B2 * | 10/2004 | Henry et al. .................. | 711/137 |
| 2003/0088740 A1 * | 5/2003 | Henry et al. .................. | 711/137 |
| 2007/0150673 A1 * | 6/2007 | Rajaram ........................ | 711/154 |

OTHER PUBLICATIONS

Zhang, et al: The Impulse Memory Controller; School of Computing, University of Utah, Sep. 24, 2001, 35 pages; IEEE Transactions on Computers, 50(11): p. 1117-1132, Nov. 2001.
Carter et al Impulse: Building a Smarter Memory Controller; In Proceedings of the 5th Int'l Symposium on High Performance Computer Architecture, pp. 70-79, Jan. 1999.

\* cited by examiner

*Primary Examiner* — Mardochee Chery
(74) *Attorney, Agent, or Firm* — Caven & Aghevli LLC

(57) ABSTRACT

A memory controller may execute instructions instead of sending the instructions to a processor for execution. To maintain synchronization between the memory controller and the processor, the memory controller may queue a null instruction in the memory controller for each non-filler instruction sent to the processor and may send a filler instruction to the processor for each non-null instruction to be executed by the memory controller.

31 Claims, 4 Drawing Sheets

METHOD, APPARATUS, AND SYSTEMS TO SUPPORT EXECUTION PIPELINING IN A MEMORY CONTROLLER

This U.S. Patent application claims priority to Indian Patent Application number 3469/DEL/2005 filed Dec. 23, 2005.

BACKGROUND

Computing devices often comprise a processor to execute instructions and control the operation of other components of the computing device. Further, computing devices often comprise a memory controller to transfer data and/or instructions between memory and other components of the computing device such as the processor. Accordingly, a processor of such computing devices may request the memory controller to transfer instructions from the memory to the processor for later execution by the processor. The transfer of instructions from memory to the processor requires a significant amount of time considering that the processor generally operates at a much faster rate than the memory controller and memory.

To somewhat alleviate the amount of time the processor waits for instructions to be transferred from memory to the processor, many processors comprise cache memories to keep frequently executed instructions and/or instructions expected to be executed in the near future close to the processor. While cache memories have greatly increased the effective performance of computing devices, additional techniques for managing the execution of instructions stored in the memory may further increase the performance of computing devices.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

In the following detailed description, numerous specific details are described in order to provide a thorough understanding of the invention. However the present invention may be practiced without these specific details. In other instances, well known methods, procedures, components and circuits have not been described in detail so as not to obscure the present invention. Further, example sizes/models/values/ranges may be given, although the present invention is not limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
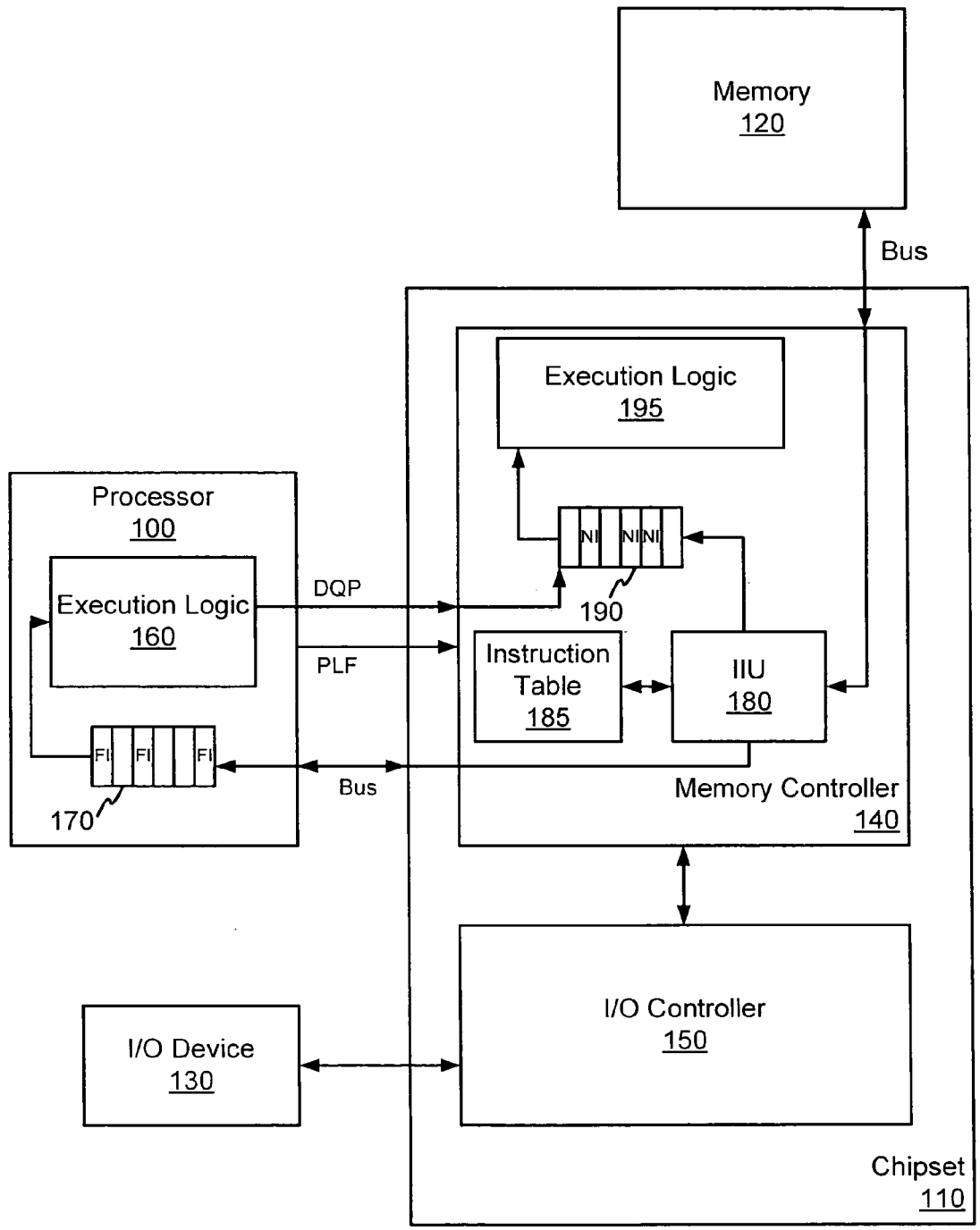
FIG. 1 illustrates an embodiment of computing device having a memory controller and a processor.

Referring to FIG. 1, an embodiment of a computing device such as, for example, a desktop computer system, server computer system, laptop computer system, personal digital assistant, hand phone, or other computing platform is shown. The computing device may include a processor 100, a chipset 110, a memory 120, and an I/O device 130. As depicted, the processor 100 may be coupled with the chipset 110 via a processor bus. The memory 120 may be coupled with the chipset 110 via a memory bus. The I/O device 130 may be coupled with the chipset 110 via an I/O bus such as, for example, PCI (Peripheral Component Interconnect) buses, PCI Express buses, USB (Universal Serial Bus) buses, SATA (Serial Advanced Technology Attachment) buses, etc.

The processor 100 may be implemented with an Intel® Pentium® 4 processor, Intel® Pentium® M processor, and/or another type of general purpose processor capable of executing software and/or firmware instructions. In one embodiment, the processor 100 may execute instructions stored in the memory 120 to perform various tasks and to control the overall operation of the computing device. In particular, the processor 100 may generate an address signal to fetch instructions from the memory. The processor 100 may execute instructions and/or routines in parallel to the instructions executed by a memory controller 140 of the chipset 110.

As depicted, the processor 100 may comprise an execution logic 160 coupled with an instruction pipeline 170. The execution logic 160 may decode and execute instructions in the instruction pipeline 170. Whenever the execution logic 160 identifies a filler instruction FI, the processor 100 may assert a dequeue signal DQP. The processor 100 may continue to dequeue and execute remaining instructions in the pipeline 170 in parallel to the execution of instructions by the memory controller 140. In one embodiment, the processor 100 may assert the dequeue signal DQP by impressing a high voltage on a dequeue signal line. However, the processor 100 in other embodiments may assert the dequeue signal DQP by impressing a low voltage, a high current, a low current, a low differential current/voltage, a high differential current/voltage, or some other signaling convention on the dequeue signal DQP. The processor may assert the dequeue signal DQP to enable the memory controller 140 to start or resume execution of instructions. The processor pipeline 170 may queue filler instructions FI as well as other instructions received from the memory controller 140.

The chipset 110 may comprise one or more integrated circuits or chips to couple the processor 100 with other components of the computing device. As depicted, the chipset 110 in one embodiment may comprise a memory controller 140 and an I/O controller hub (ICH) 150. The memory controller 140 may provide an interface to memory devices of the memory 120. The memory controller 140 may generate signals on the memory bus to read and/or write data to memory devices of the memory 120 in response to requests from the processor 100 and I/O devices 130. In particular, the memory controller 140 may execute instructions of the memory controller pipeline 190 in response to an asserted dequeue signal DQP from the processor 100 thus enabling the memory controller 140 to execute instructions of the memory 120 in parallel to the processor 100 executing instructions of the memory 120. The memory controller 140 may halt execution of pipelined instructions whenever the memory controller 140 executes a null instruction NI of the memory controller pipeline 190 and may wait for an asserted dequeue signal DQP from the processor 100 in order to resume execution of the instructions in the memory controller pipeline 190.

The memory 120 may store instructions to be executed by the memory controller 140 and/or processor. The memory may comprise for example a RAM (Random Access Memory) devices such as source synchronous dynamic RAM devices and DDR (Double Data Rate) RAM devices.

The I/O controller hub (ICH) 150 according to an embodiment may comprise a general purpose I/O controller hub. The I/O controller hub 150 may implement various input/output functions for the computing device. For example, the I/O device 130 may comprise hard disk drives, keyboards, mice, CD (compact disc) drives, DVD (digital video discs) drives, printers, scanners, etc.

As depicted, the memory controller 140 may comprise an instruction interpretation unit 180 coupled to the memory controller pipeline 190, which may be coupled to an execution logic. For each instruction fetched from the memory 120, upon receiving address signal from the processor 100, the instruction interpretation unit 180 may determine based upon an instruction table 185 whether the memory controller 140 or the processor 100 is to execute the instruction. The instruction table 185, in one embodiment may contain opcodes (operational codes) of all instructions that are executable by the memory controller 140. If the instruction interpretation unit 180 determines based upon the opcodes of the instruction table 185 that the memory controller 140 supports execution of the instruction, the instruction interpretation unit 180 may queue the instruction in the memory controller pipeline 190. For each instruction queued in the memory controller pipeline 190, the instruction interpretation unit 180 may generate and forward a filler instruction FI to the processor 100. The filler instruction FI may get pipelined in the processor pipeline 170 as a place holder for the instruction to be executed by the memory controller 140. If the instruction interpretation unit 180 determines based upon the opcodes of the instruction table 185 that the memory controller 140 does not support execution of the instruction, then the instruction interpretation unit 180 may forward the instruction fetched from the memory 120 to the processor 100. The instruction interpretation unit 180 may store a null instruction NI in the memory controller pipeline 190 for each instruction sent to the processor 100 for execution.

The filler instruction FI may comprise for example an instruction with a predefined operational code (opcode). For every instruction in the memory controller pipeline 190, there may be a corresponding filler instruction FI in the processor pipeline 170. The processor pipeline 170 may contain more than one filler instruction FI at a given time frame and may contain contiguous filler instructions FI.

In one embodiment, multiple filler instructions FI may be consecutively arranged in the processor pipeline 170. In such a situation, the processor 100 may assert a dequeue signal DQP for each successive filler instruction FI in the instruction pipeline 170. Thus, consecutive filler instructions FI may result in asserting the dequeue signal DQP in rapid succession. Such rapid assertions of the dequeue signal DQP may lead to more power consumption by the processor 100. Because the memory controller 140 may operate at a slower rate than the processor, the memory controller 140 may further comprise buffer circuitry to ensure each assertion of the dequeue buffer signal.

During the instruction decode, if the processor 100 identifies the instruction to be a filler instruction FI, the processor 100 may assert the dequeue signal DQP to cause the memory controller 140 to resume execution of instructions in the memory controller pipeline 190. The processor 100 may then continue to execute instructions of the processor pipeline 170 in parallel with the memory controller 140 executing instructions of the memory controller pipeline 190.

In one embodiment, if the processor 100 decodes a filler instruction FI from the processor pipeline 170, the processor 100 may determine whether the previous instruction was also a filler instruction FI. If the processor 100 determines that the previously decoded instruction of the processor pipeline 170 is also a filler instruction FI, the processor 100 may refrain from reasserting the dequeue signal DQP. In this manner, the processor 100 may assert the dequeue signal DQP only once per each group of consecutive filler instructions FI.

On the other side, the memory controller 140 upon receiving a dequeue signal DQP from the processor 100 may initiate decoding and execution of all the instructions pipelined in the memory controller pipeline 190 until the memory controller 140 executes a null instruction NI of the memory controller pipeline 190. The null instruction NI in memory controller pipeline 190 may correspond to a valid instruction in the processor pipeline 170 and null instruction NI may serve as a bookmark in the memory controller pipeline 190, indicating where/when to hold on dequeuing the memory controller pipeline 190. When decode and execution logic finds a null instruction NI, the execute logic execution logic may stop dequeuing the memory controller pipeline 190 and may wait until the next assertion of the dequeue signal DQP from the processor 100. Thus, the presence of filler instructions FI and null instructions NI synchronizes the execution of instructions across the pipeline 170 in the processor 100 and the pipeline 190 in the memory controller 140.

The dequeue signal DQP may comprise an interrupt driven by the processor 100 in response to a filler instruction FI to trigger the instruction decode and execution logic provided in the memory controller 140 to dequeue and execute instructions from the memory controller pipeline 190. The instruction in the memory controller pipeline 190 may be decoded and executed one after the other until a null instruction NI is executed. When a null instruction NI is executed, the memory controller 140 may suspend dequeuing of the memory controller pipeline 190 and may deassert the dequeue signal DQP to acknowledge that the memory controller 140 has completed the execution of the instruction corresponding to the filler instruction FI in the processor pipeline 170.

In one embodiment, the memory controller pipeline 190 comprises a null instruction NI for each non-filler instruction in the processor pipeline 170. Conversely, the processor pipeline 170 comprises a filler instruction NI for each non-null instruction in the memory controller pipeline 190. Therefore, at any given point of time, the memory controller pipeline 190 may be a converse of the processor pipeline 170. In one embodiment, the processor 100 may further assert a pipeline flush signal PLF in response to flushing the processor pipeline 170. For example, the processor 100 may flush the processor pipeline 170 in response to a branch misprediction. The instruction interpretation unit 180 upon receiving an asserted pipeline flush signal PLF may flush the memory controller pipeline 190.

Figure 2:
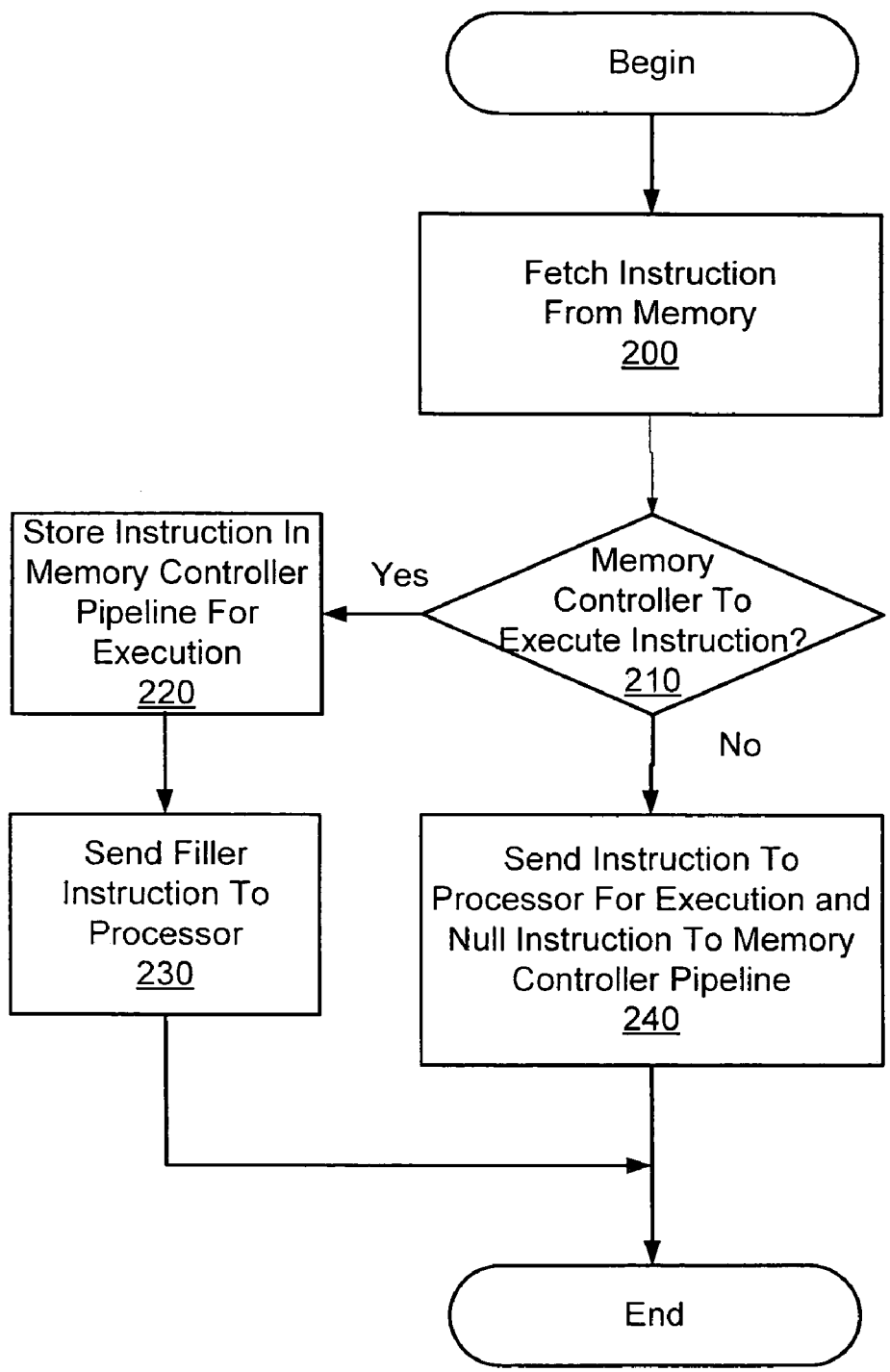
FIG. 2 illustrates an instruction scheduling operation of the memory controller depicted in FIG. 1.

Reference is now made to FIG. 2 which depicts an instruction scheduling operation of an embodiment of the memory controller 140. As depicted in block 200, the memory controller 140 may fetch one or more instructions from the memory 120 in response to memory requests received from the processor 100. In particular, the memory controller 140 may fetch instructions from the memory 120 due to fetch and/or prefetch activities of the processor 100. In block 210, the instruction interpretation unit 180 may determine whether the memory controller 140 or the processor 100 is to execute the fetched instruction. In one embodiment, the instruction interpretation unit 180 may make such a determination based up looking up the instruction in the instruction table 185.

In response to determining that the memory controller 140 is to execute the instruction, the memory controller 140 in block 220 may store the instruction in the memory controller pipeline 190 for future execution by the memory controller 140. Furthermore, the memory controller 140 in block 230 may provide the processor 100 with a filler instruction FI to represent in the processor pipeline 170 the instruction stored in the memory controller pipeline 190. However, if the memory controller 140 instead determines that the processor 100 is not to execute the instruction, the memory controller 140 may provide the instruction to the processor 100 for future execution by the processor 100 and may provide the memory controller pipeline 190 with null instruction NI to represent in the memory controller pipeline 190 the instructions stored in the processor pipeline 170. (block 240).

Figure 3:
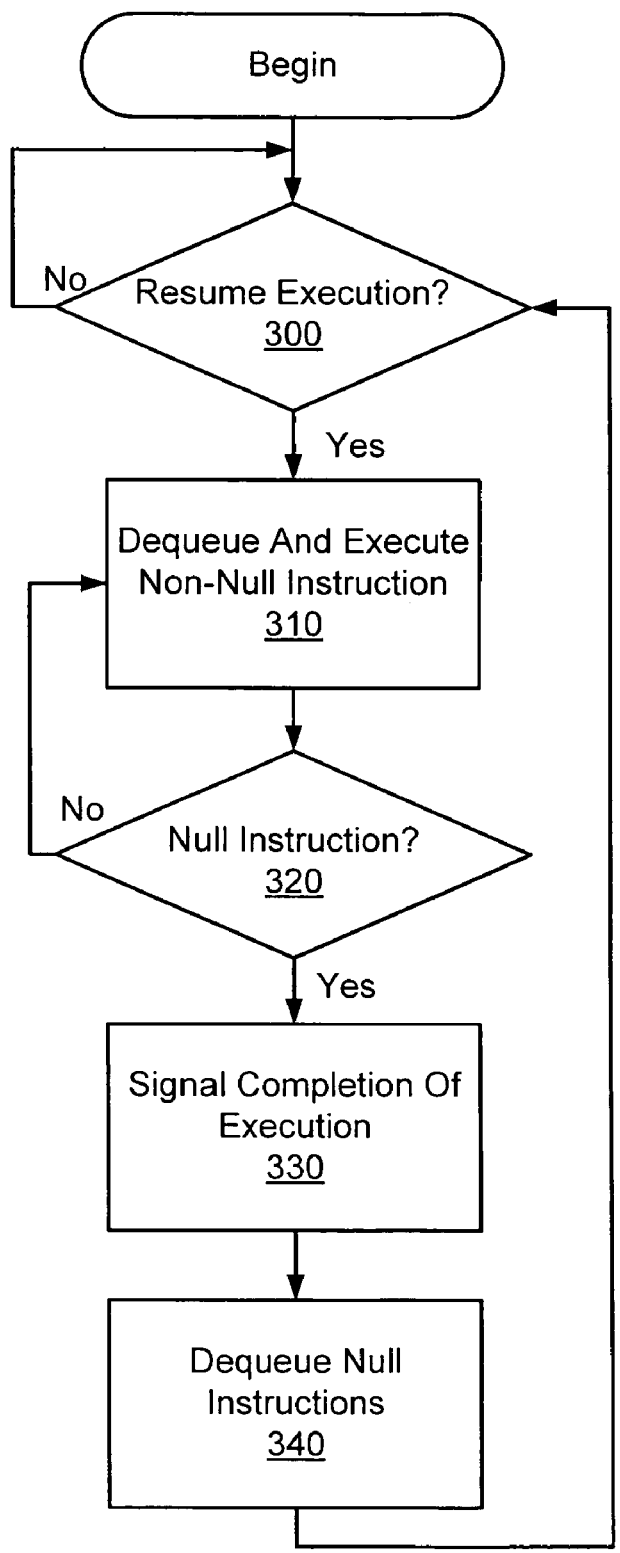
FIG. 3 illustrates an instruction execution operation of the memory controller depicted in FIG. 1.

Reference is now made to FIG. 3 which depicts an instruction execution operation of an embodiment of the memory controller 140. As depicted in block 300, the execution logic 195 of the memory controller 140 may determine whether to resume execution of the instructions in the memory controller pipeline 190. In one embodiment, the execution logic 195 determines to resume execution in response to the processor 100 asserting the dequeue signal DQP. Accordingly, the execution logic 195 may wait in block 300 until the processor 100 asserts the dequeue signal DQP.

In response to determining to resume execution, the execution logic 195 in block 310 may dequeue and execute an instruction of the memory controller pipeline 190. In block 320, the execution logic 195 may determine whether the next instruction (e.g. the instruction following the instruction dequeued and executed in block 310) of the memory controller pipeline 170 is a null instruction. If the instruction is not a null instruction, then the execution logic 195 returns to block 310 in order to dequeue and execute the instruction. In this manner, the execution logic 195 continues to execute instructions of the memory controller pipeline 170 until a null instruction is executed.

In response to determining that the instruction is a null instruction NI, the execution logic 195 in block 340 may signal completion of instructions associated with the received asserted dequeue signal DQP. In one embodiment, the execution logic 195 signals completion by deasserting the dequeue signal DQP. The execution logic 195 then in block 350 dequeues one or more null instructions NI of the memory controller pipeline 190. In one embodiment, the execution logic 195 continues to dequeue instructions until a non-null instruction is encountered. In this manner, the execution logic 195 ensures that the memory controller pipeline 190 includes a non-null instruction to execute in response to the processor 100 requesting the memory controller 140 to resume execution.

Figure 4:
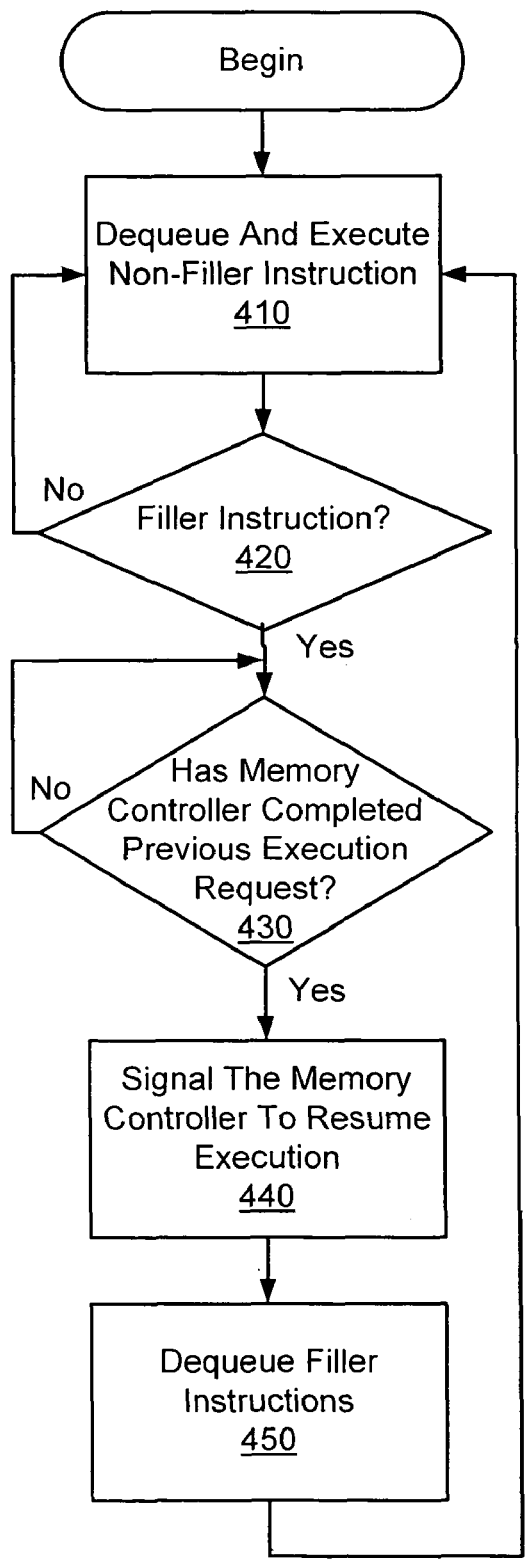
FIG. 4 illustrates an instruction execution operation of the processor depicted in FIG. 1.

Reference is now made to FIG. 4 which depicts an instruction execution operation of an embodiment of the processor 100. As depicted in block 410, the processor may dequeue and execute an instruction of the processor pipeline 170. In block 420, the processor 100 may determine whether the next instruction (e.g. the instruction following the instruction dequeued and executed in block 410) of the processor pipeline 170 is a filler instruction FI. If the instruction is not a filler instruction FI, then the processor 100 may return to block 410 in order to dequeue and execute the instruction. In this manner, the processor 100 continues to execute instructions of the processor pipeline 170 until a filler instruction FI is encountered.

In block 430, the processor 100 may determine whether the memory controller 140 has completed the previous request for execution. In one embodiment, the processor 100 may determine that the memory controller 140 has completed the previous request in response to the memory controller 140 deasserting the dequeue signal DQP. If the previous request has not completed, then the processor 100 may wait in block 420 until the previous request has completed. In this manner, the processor 100 may execute instructions in parallel with instructions executed by the memory controller 140 after requesting the memory controller 140 to resume execution, but may maintain synchronization with the memory controller 140 by ensuring only one request for execution is pending at a time.

In response to determining that the instruction is a filler instruction FI and the memory controller 140 has completed its previous request for execution, the processor 100 in block 440 may signal that the memory controller 140 is to resume execution of the instructions in the memory controller pipeline 190. In one embodiment, the processor 100 may signal the resumption of the memory controller 140 by asserting the dequeue signal DQP. The processor 100 then in block 450 may dequeue one or more filler instructions FI of the processor pipeline 170. In one embodiment, the processor 100 may continue to dequeue instructions until a non-filler instruction is encountered. In this manner, the processor 100 may ensure that the memory controller pipeline 190 is signaled only once per a series of consecutive filler instructions FI in the processor pipeline 170.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method of a memory controller to interface a processor to a memory comprising:
    fetching an instruction from the memory; and
    sending a filler instruction to the processor for the fetched instruction to be executed by the memory controller in response to a determination that the fetched instruction is to be executed by the memory controller based on a comparison of an opcode of the fetched instruction with stored information that indicates which opcodes are to cause a corresponding instruction to be executed by the memory controller,
    wherein the fetched instruction is to be executed by the memory controller and the filler instruction is to be executed by the processor.

2. The method of claim 1, further comprising
    fetching another instruction from the memory,
    determining the another instruction is to be executed by the processor,
    sending the another instruction to the processor for execution by the processor, and
    queuing a null instruction in the memory controller that corresponds to the another instruction sent to the processor.

3. The method of claim 1, further comprising queuing the instruction until executed by the memory controller.

4. The method of claim 1, further comprising
queuing the instruction until executed by the memory controller, and
flushing any queued instructions in response to a pipeline flush signal from the processor.

5. The method of claim 1, further comprising
queuing a null instruction in the memory controller that corresponds to the another instruction sent to the processor for execution, and
halting execution of queued instructions to be executed by the memory controller in response to the memory controller executing the null instruction.

6. The method of claim 1, further comprising
queuing a null instruction in the memory controller that corresponds to the another instruction sent to the processor for execution,
halting execution of queued instructions to be executed by the memory controller in response to the memory controller executing the null instruction, and
resuming execution of the queued instructions in response to a dequeue signal from the processor.

7. The method of claim 1, further comprising
queuing a null instruction in the memory controller that corresponds to the another instruction sent to the processor for execution,
halting execution of queued instructions to be executed by the memory controller in response to the memory controller executing the null instruction, and
dequeuing a plurality of consecutive null instructions that comprises the null instruction that resulted in halting execution in response to a dequeue signal from the processor.

8. The method of claim 1, wherein executing the instruction comprises executing the instruction in response to a dequeue signal from the processor.

9. The method of claim 1, wherein for each instruction in a pipeline of the memory controller, a corresponding filler instruction is to be stored in a pipeline of the processor.

10. The method of claim 1, further comprising the processor asserting a dequeue signal for a pipeline of the memory controller only once for a plurality of contiguous filler instructions stored in a pipeline of the processor.

11. For use with a memory controller that provides an interface to a memory, a method of a processor comprising:
queuing instructions received from the memory controller,
executing queued instructions, and
requesting the memory controller to resume execution of instructions queued in the memory controller in response to executing a filler instruction by the processor, wherein the filler instruction is to be queued in response to a determination that an instruction is to be executed by the memory controller based on a comparison of an opcode of the instruction with stored information that indicates which opcodes are to cause a corresponding instruction to be executed by the memory controller, wherein the instruction is to be executed by the memory controller and the filler instruction is to be executed by the processor.

12. The method of claim 11 wherein requesting comprises asserting a dequeue signal to request the memory controller to resume execution of instructions queued in the memory controller.

13. The method of claim 11, further comprising
flushing the queued instructions from the processor, and
requesting the memory controller to flush instructions to be executed by the memory controller.

14. The method of claim 11, further comprising
flushing the queued instructions from the processor, and
asserting a flush signal to inform the memory controller that the processor flushed the queued instructions.

15. The method of claim 11, further comprising dequeuing a plurality of consecutive filler instructions that comprises the filler instruction that resulted in requesting the memory controller to resume execution.

16. The method of claim 11, further comprising determining the memory controller has completed execution of instructions associated with a previous request to resume execution prior to requesting the memory controller to resume execution.

17. A memory controller comprising:
a pipeline to queue instructions,
an execution logic to execute instructions of the pipeline,
an instruction interpretation unit to send a filler instruction to a processor in response to a determination that an instruction fetched from a memory is to be executed by the memory controller based on a comparison of an opcode of the fetched instruction with stored information that indicates which opcodes are to cause a corresponding instruction to be executed by the memory controller,
wherein the fetched instruction is to be executed by the memory controller and the filler instruction is to be executed by the processor.

18. The memory controller of claim 17, wherein the instruction interpretation unit stores another instruction fetched from the memory in the pipeline in response to determining that the another instruction is to be executed by the execution logic of the memory controller, and sends a filler instruction to the processor that corresponds to the another instruction queued in the pipeline.

19. The memory controller of claim 17, wherein the instruction interpretation unit flushes instructions from the pipeline in response to a pipeline flush signal from the processor.

20. The memory controller of claim 17, wherein the execution logic halts execution of instructions queued in the pipeline in response to executing a null instruction.

21. The memory controller of claim 17, wherein the execution logic halts execution of instructions queued in the pipeline in response to executing a null instruction, and resumes execution of instructions queued in the pipeline in response to a dequeue signal from the processor.

22. The memory controller of claim 17, wherein the execution logic halts execution of instructions queued in the pipeline in response to executing a null instruction, and in response to a dequeue signal from the processor, dequeues from the pipeline a plurality of consecutive null instructions that comprises the null instruction that resulted in halting execution.

23. A processor comprising;
a pipeline to queue instructions,
an execution logic to execute instructions of the pipeline, and to request a memory controller to resume execution of instructions queued in the memory controller in response to executing a filler instruction from the pipeline that is to be provided in response to at least one of the queued instructions and in response to a determination that the at least one queued instruction is to be executed by the memory controller based on a comparison of an opcode of the at least one queued instruction with stored information that indicates which opcodes are to cause a corresponding instruction to be executed by the memory controller, wherein the at least one queued instruction is to be executed by the memory controller and the filler instruction is to be executed by the processor.

24. The processor of claim 23, wherein the execution logic further requests the memory controller to flush instructions to be executed by the memory controller in response to flushing the pipeline.

25. The processor of claim 23, wherein the execution logic further dequeues from the pipeline a plurality of consecutive filler instructions that comprises the filler instruction that resulted in requesting the memory controller to resume execution.

26. The processor of claim 23, wherein the execution logic further determines the memory controller has completed execution of instructions associated with a previous request to resume execution prior to requesting the memory controller to resume execution.

27. A system comprising
a memory to store instructions,
a processor to execution instructions, and
a memory controller to fetch instructions from the memory, to queue instructions for execution by the memory controller, and to send instructions to the processor for execution in response to determining the processor is to execute the instructions, wherein the processor is to request the requests a memory controller to resume execution of instructions queued in the memory controller in response to a determination that the fetched instruction is to be executed by the memory controller based on a comparison of an opcode of the fetched instruction with stored information that indicates which opcodes are to cause a corresponding instruction to be executed by the memory controller, wherein the fetched instruction is to be executed by the memory controller and a filler instruction is to be executed by the processor.

28. The system of claim 27, further comprising:
an execution logic to execute instructions of the pipeline,
an instruction interpretation unit to send an instruction fetched from the memory to the processor in response to determining that the instruction is to be executed by the processor, and to store a null instruction in the pipeline in place of each non-filler instruction to be executed by the processor, wherein the memory controller queues a null instruction for each non-filler instruction sent to the processor and sends a filler instruction to the processor for each non-null instruction queued in the memory controller.

29. The system of claim 28 wherein
the memory controller halts execution of instructions queued in the memory controller in response to executing a null instruction, and
the processor requests the memory controller to resume execution in response to executing a filler instruction.

30. The system of claim 29 wherein the memory controller, in response to a request to resume execution, dequeues from the memory controller a plurality of consecutive null instructions that comprises the null instruction that resulted in halting execution.

31. The system of claim 30, wherein the processor further dequeues from the pipeline a plurality of consecutive filler instructions that comprises the filler instruction that resulted in requesting the memory controller to resume execution.

\* \* \* \* \*

UNITED STATES PATENT AND TRADEMARK OFFICE
CERTIFICATE OF CORRECTION

PATENT NO.        : 8,190,830 B2
APPLICATION NO.   : 11/372647
DATED             : May 29, 2012
INVENTOR(S)       : Gurumurthy Rajaram Page 1 of 1

It is certified that error appears in the above-identified patent and that said Letters Patent is hereby corrected as shown below:

In column 8, line 54, in claim 23, delete "comprising;" and insert -- comprising: --, therefor.

In column 9, line 26, in claim 27, after "the" delete "requests a".

Signed and Sealed this
Fourteenth Day of August, 2012

David J. Kappos
*Director of the United States Patent and Trademark Office*